(12) United States Patent
Huang

(10) Patent No.: US 6,192,772 B1
(45) Date of Patent: Feb. 27, 2001

(54) CONTROLLER FOR THE BRAKE OF A ROLLING WALKKIT

(76) Inventor: Shih-Yi Huang, No. 1, Chia Tai Road, Tai Pao Shih, Chia Yi Hsien (TW)

( * ) Notice: Subject to any disclaimer, the term of this patent is extended or adjusted under 35 U.S.C. 154(b) by 0 days.

(21) Appl. No.: 09/390,405

(22) Filed: Sep. 3, 1999

(51) Int. Cl.[7] .................................................. F16C 1/12
(52) U.S. Cl. ............................................ 74/502.2; 74/489
(58) Field of Search ................................. 74/502.2, 502, 74/501.6, 488, 489

(56) References Cited

U.S. PATENT DOCUMENTS

| | | | |
|---|---|---|---|
| 5,279,180 | * | 1/1994 | Henriksson ........................ 74/502.2 |
| 5,865,065 | * | 2/1999 | Chiu .................................. 74/502.2 |
| 5,896,779 | * | 4/1999 | Biersteker et al. ................ 74/502.2 |
| 6,032,765 | * | 3/2000 | Hsi-Chia ......................... 74/502.2 X |
| 6,079,290 | * | 6/2000 | Li .................................... 74/502.2 |
| 6,098,487 | * | 8/2000 | Chien ................................ 74/502.2 |

\* cited by examiner

*Primary Examiner*—MaryAnn Green
(74) *Attorney, Agent, or Firm*—Pro-Techtor International Services

(57) ABSTRACT

A controller for the brake of a rolling walkkit includes a controller base, a grip and a connect rod combined together. The controller base has an upper cylindrical portion fixed around a handrest of the rolling walkkit and a lower hollow portion for pivotally connecting the joint member of the grip, and the control rod is pivotally connected inside said grip. When the grip is pushed up, the connect rod is moved to swing to pull forward a brake wire firmly fixed with a lower end of the connect rod to brake the wheels of the walkkit temporarily in moving, and releasing the grip lets the brake wire also loosened to let the wheels to move again. When the grip is pressed down, the connect rod is forced to swing and let the brake wire pulled forward to stop the wheels for a long time, and releasing the grip lets the brake wire recover, permitting the wheels of the walkkit move again.

2 Claims, 4 Drawing Sheets

CONTROLLER FOR THE BRAKE OF A
ROLLING WALKKIT

BACKGROUND OF THE INVENTION

This invention relates to a controller for a rolling walkkit, particularly to one having a simple structure to be operated easily and hardly getting out of order.

Nowadays, rolling walkkits, wheel chairs are widely used by the disabled, having a brake to keep them safe in moving. However, conventional brakes used in them are often found to be complicated not easy to be assembled together. In addition, their operation is not stable owing to the components liable to separate from each other or position not securely.

SUMMARY OF THE INVENTION

This invention has been devised to offer a controller for the brake of a rolling walkkit or a wheel chair, having a structure of few components but easily to handle and hardly getting our of order.

The feature of the invention is a controller base, a grip and a control rod combined together to pull forward a brake wire for stopping the wheels of the rolling walkkit in two kinds of modes, one for braking temporarily by pushing up the grip and the other for a long time by pressing down the grip. And releasing the grip frees the brake to let the wheels of the rolling walkkit move again.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
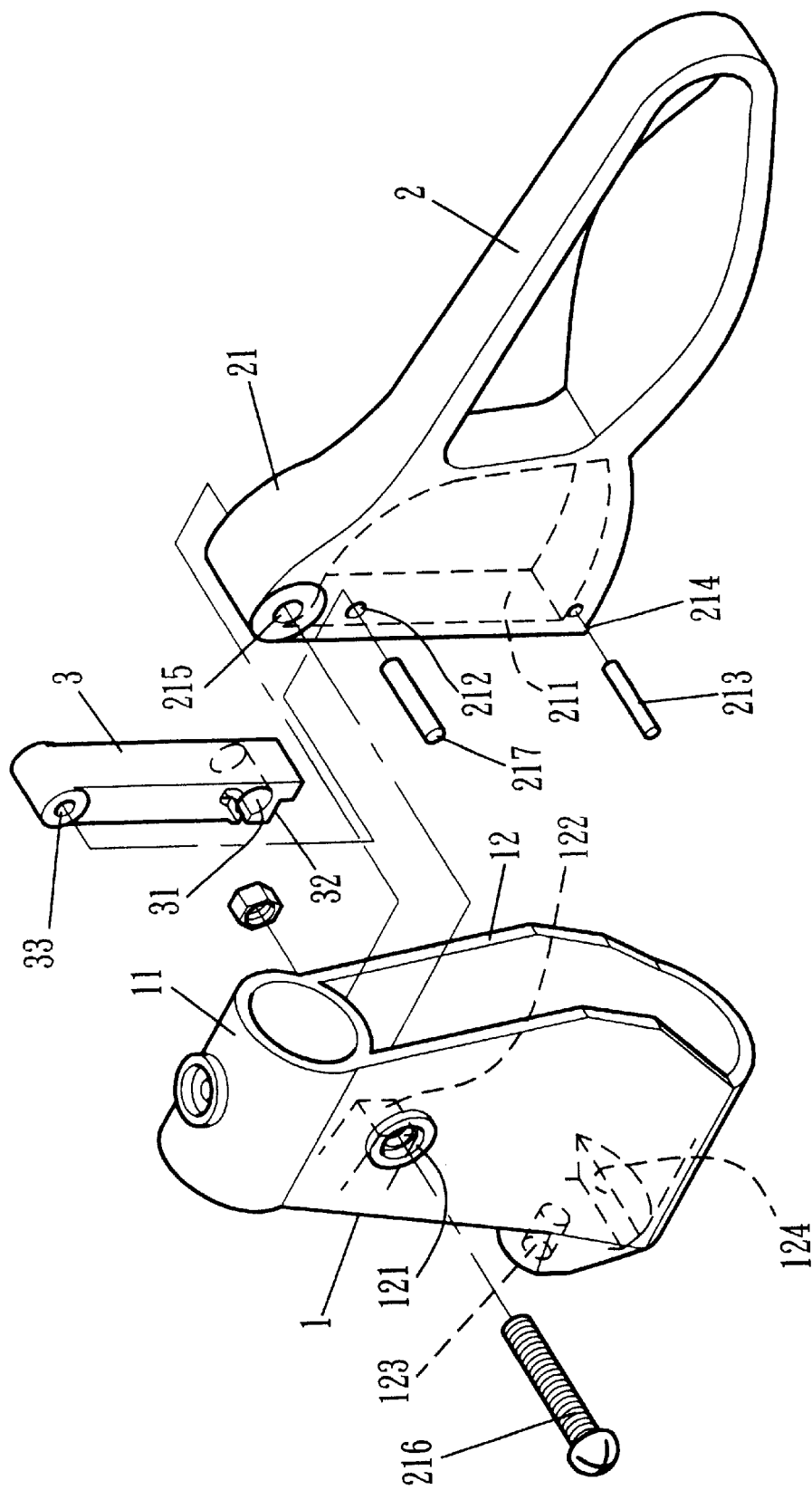
FIG. 1 is an exploded perspective view of a controller for the brake of a rolling walkkit in the present invention.

A preferred embodiment of a controller for a brake of a rolling walkkit or a wheel chair in the present invention, as shown in FIG. 1, includes a controller base 1, a grip 2, and a control rod 3 as main components combined together.

Figure 2:
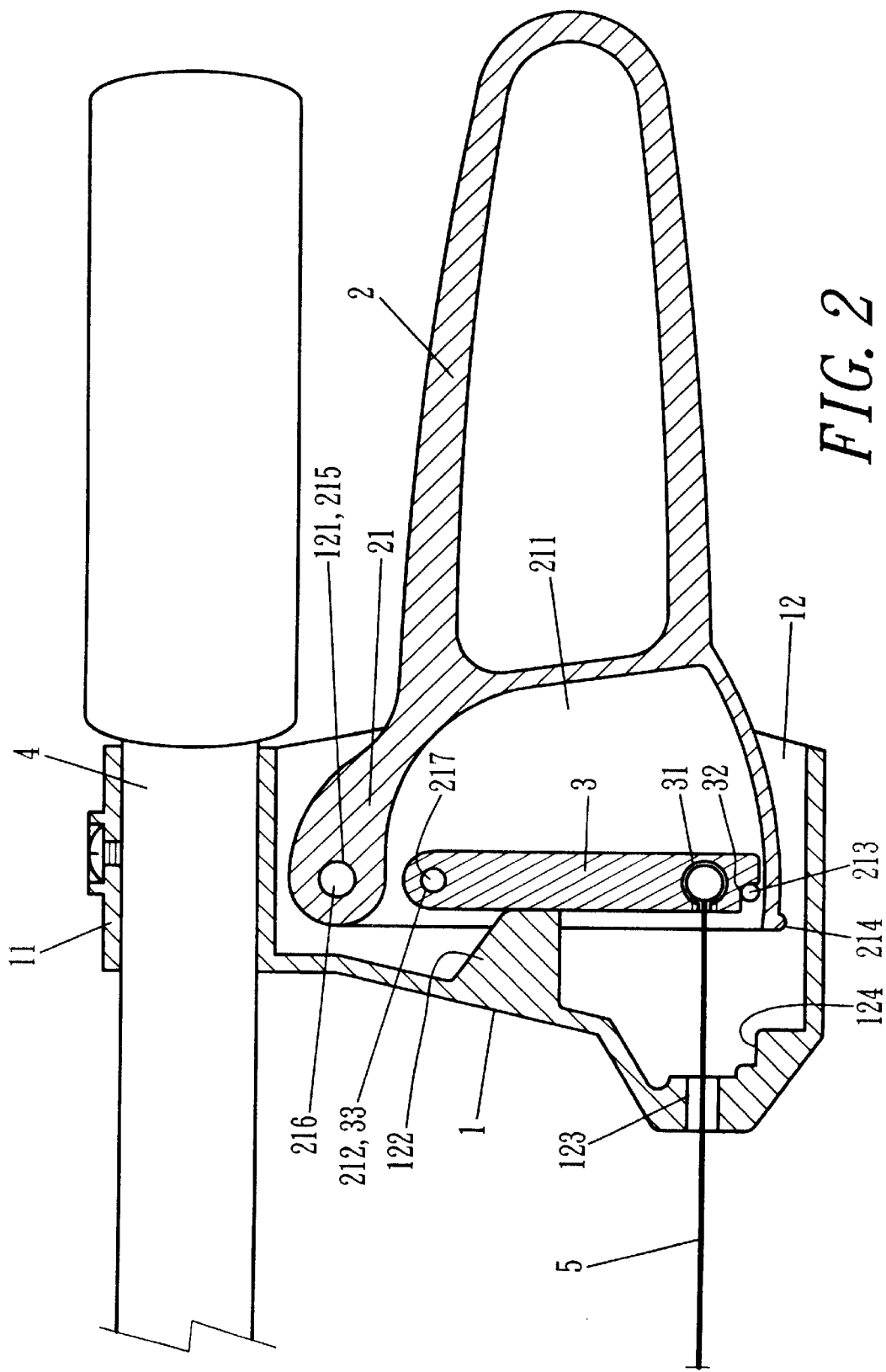
FIG. 2 is a cross-sectional view of the controller for the brake of a rolling walkkit in the present invention.

The controller base 1 has an upper cylindrical portion 11 for fitting tightly around a handrest 4 of a rolling walkkit for the disabled, the crippled, etc, and a hollow portion 12 formed under the upper cylindrical portion 11 and having a front opening, two parallel side walls and a bottom wall, a pivot hole 121 respectively in the two parallel side walls, a stop block 122 formed to project on an inner surface of a rear wall as shown in FIG. 2, a wire hole 123 formed below the stop block 122 in the rear wall, and a stop surface 124 formed below the wire hole 123 on an inner surface of the rear wall and having a curved corner.

The grip 2 has a joint member 21 in a rear portion to extend in the hollow portion of the controller base 1, a front grip portion extending forward from the joint member 21, a hollow 211 opening to the rear side of the joint member 21, a pivot hole 212 respectively bored in two parallel side walls of the joint member 21, a lateral pin 213 inserting in a location near the lower end of the two side walls, and a downward projection 214 formed on a lower end corner of the side walls. The grip 2 further has a lateral hole 215 formed in an upper end of the joint member 21 to face the pivot hole 121 of the controller base 1 for a screw 216 to pass through the pivot 121 and the lateral hole 215 to combine pivotally the grip 2 with the controller base 1 after the joint member 21 of the grip 2 is inserted in the hollow portion 12.

The control rod 3 is located in the hollow 211 of the grip 2, having a wire groove 31 formed near the bottom, an L-shaped surface 32 formed under the wire groove 31, a lateral hole 33 formed in an upper end to face the pivot hole 212 of the grip for a connect rod 217 to extend therein for pivotally connecting the control rod 3 with the grip 2.

In assembling the controller for the brake of a rolling walkkit, as shown in FIG. 2, firstly one end of the brake wire 5 is set in the wire groove 31, and then the control rod 3 is fitted in the hollow 211 of the grip 2, with the lateral hole 33 pivotally connected to the pivot hole 212 with the connect rod 217. Next, the grip 2 together with the control rod 3 is placed in the hollow portion 12 of the controller base 1, with the brake wire 5 passing through the wire hole 123 of the controller base 1, and with the lateral hole 215 of the joint member 21 of the grip 2 pivotally connected to the pivot hole 121 with the connect rod 216, thus assembling the controller base 1, the grip 2 and the control rod 3 together. In the assembled position, the control rod 3 rests vertically against the the outer end of the stop block 122 owing to pulling force of the brake wire 5, with the L-shaped surface 32 of the control rod 3 stopped by the pin 213, forming a non-braking condition of the controller to let the wheels of the rolling walkkit free to move. Finally, the cylindrical portion of the controller base 1 is fixed around the handrest 4 of a rolling walkkit or a wheel chair.

Figure 3:
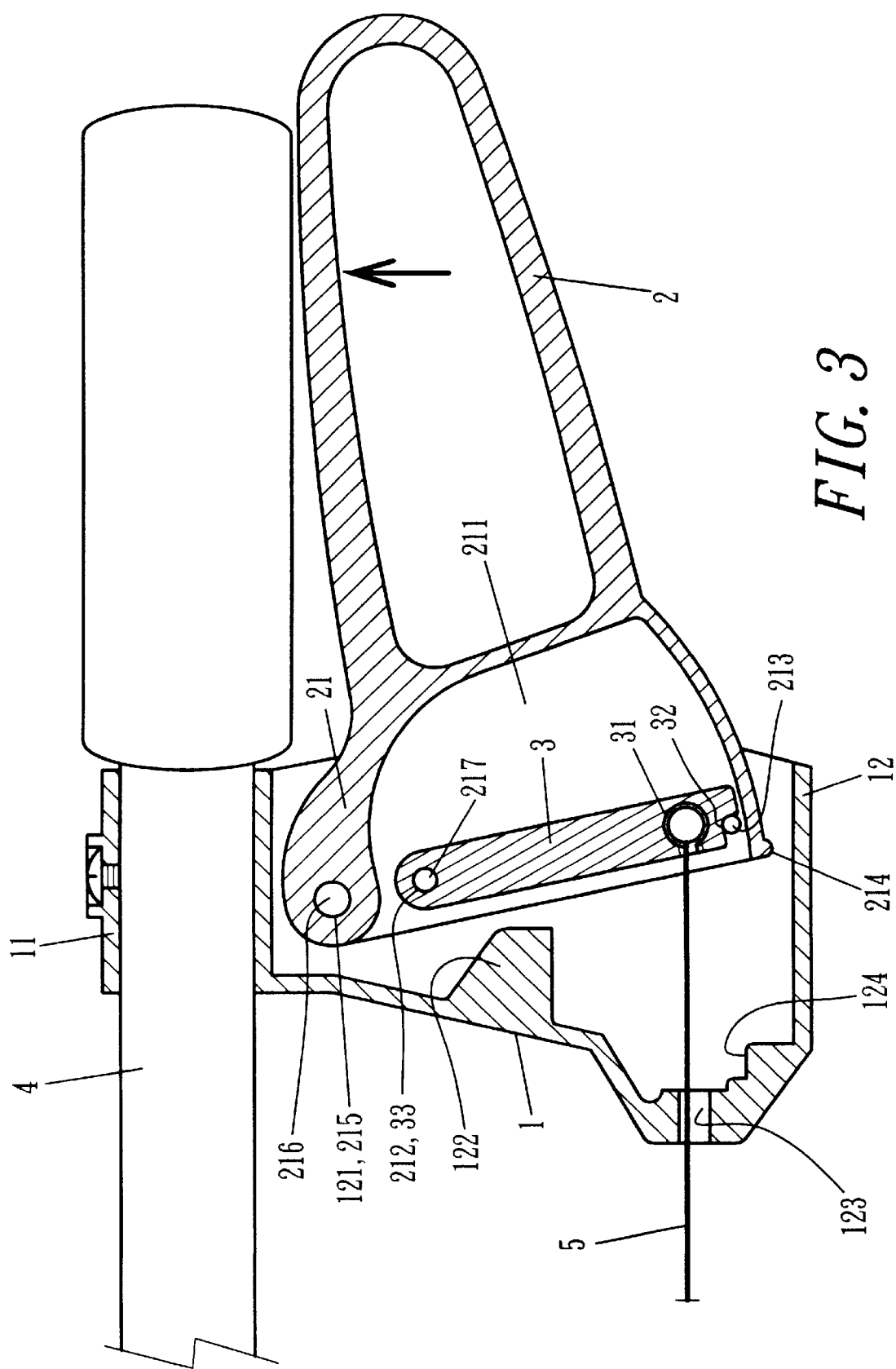
FIG. 3 is a cross-sectional view of the controller for the brake of a rolling walkkit in the present invention, showing it being in a temporary braking condition; and, FIG. 4 is a cross-sectional view of the controller for the brake of a rolling walkkit in the present invention, showing it being in a stopping condition.
Figure 4:
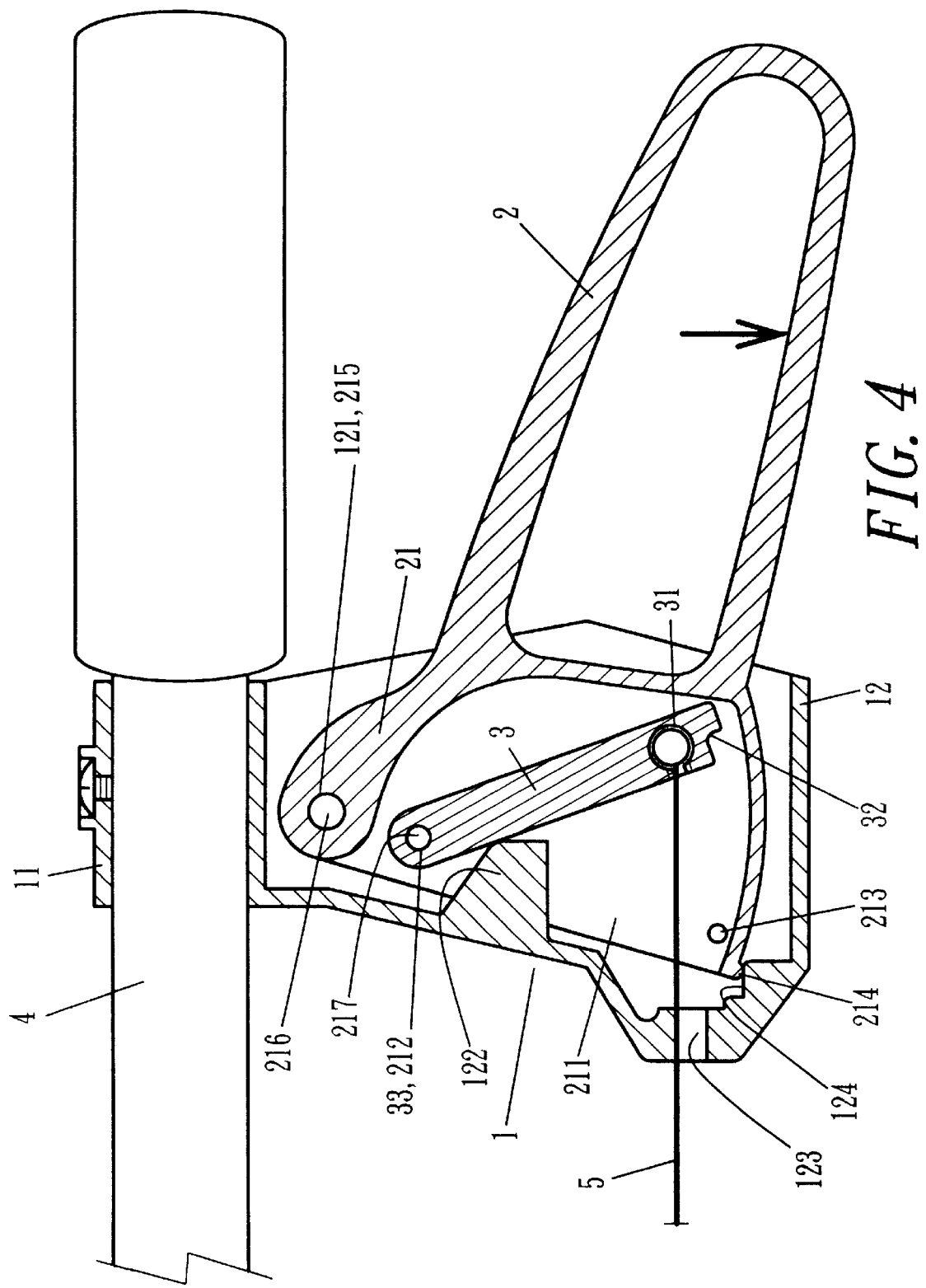

In handling the controller for the brake of the rolling walkkit, there are two kinds of modes, one for temporary braking as shown in FIG. 3 and the other for stopping for a long time as shown in FIG. 2. The temporary braking is effected by pushing up the grip 2, which then moves the lateral pin 213 to the right side, and the pin 213 moves at the same time the control rod 3 to swing to the right side (or forward) with the connect rod 217 function as a pivot, pulling the brake wire 5 forward to brake the wheels of the rolling walkkit. Then if the grip 2 is released, the brake wire 5 at once pulls the control rod 3 back, which then moves back to rest on the stop block 122 to permit the rolling walkkit move again.

If the rolling walkkit or the wheel chair is to be stopped for a long time, the grip 2 is pressed down to a stop position, wherein the joint member 21 is forced to swing inward in the hollow portion 12 with the pivot point until the projection 214 of the joint member 21 moves over the curved corner to rest against the stop surface 214, with the control rod 3 swinging toward the the grip 2 as the intermediate portion of the connect rod 3 is stopped by the stop surface 122 of the controller base 1 with the lateral hole 33 as a pivot to let the lower end of the control rod 3 move and pull the brake wire 5 to the right side to keep the wheels of the rolling walkkit stopped for a long time, even the grip 2 is released. If the rolling walkkit is to be moved again, the grip 2 is pushed up from the stopped position, forcing the projection 214 separate from the stop surface 124, and then the brake wire 5 recovers its position shown in FIG. 2, i.e. the free position to let the rolling walkkit move.

In general, the components of the controller for the brake of a rolling walkkit or a wheel chair in the invention are few and simple, easy to be assembled together, and hardly getting out of order.

While the preferred embodiment of the invention has been described above, it will be recognized and understood that various modifications may be made therein and the appended claims are intended to cover all such modifications which may fall within the spirit and scope of the invention.

Enclosed: a photocopy of U.S. Pat. No. Des. 375,708 and 367,833.

I claim:

1. A controller for the brake of a rolling walkkit or a wheel chair, comprising:

a controller base having an upper cylinder portion fixed around a handrest of said rolling walkkit, and a lower hollow portion formed under said upper cylinder portion, a stop block formed to protrude on an inner surface of a rear wall of said lower hollow portion, a wire hole formed in said rear wall below said stop block, a stop surface formed on an inner wall defining said lower hollow portion, said lower hollow portion having a front opening defined by two side walls extending down from said upper cylindrical portion and a bottom wall;

a grip having a joint member vertical formed in a rear portion to extend through said front opening of said lower hollow portion of said controller base into said hollow space, a front portion extending forward from said joint member located outside of said lower hollow portion of said controller base, an upper end of said joint member pivotally connected to said controller base at a pivot point, a hollow formed behind a rear vertical wall of said joint member to correspond to said stop block, a lateral pin provided to insert through a lower wall of said hollow, and a projection formed in a lower end of said rear vertical wall;

a control rod shaped to be located and move in said hollow of said joint member of said grip, having an upper end pivotally connected to said joint member of said grip at a pivot point, a lower end connected firmly with an end of a brake wire, and a lower end edge located below said lateral pin of said grip; and, said rolling walkkit being put on brake temporarily in moving when said grip is pushed upward to force said lateral pin move said control rod to swing with said pivot point to pull forward said brake wire; said rolling walkkit being stopped for a long time when said grip is pressed down to a stop position, wherein said grip forces said projection move to engage said stop surface of said controller base, said control rod having its lower end swing toward said grip as its intermediate portion stopped by said stop block with said brake wire pulled forward to keep said wheels of said rolling walkkit in stopped condition.

2. The controller for the brake of a rolling walkkit or a wheel chair as claimed in claim 1, wherein said control rod has an L-shaped surface formed in its lower end so as to contact and stop said lateral pin of said grip.

* * * * *